US011954662B2

(12) United States Patent
Huang et al.

(10) Patent No.: US 11,954,662 B2
(45) Date of Patent: Apr. 9, 2024

(54) METHOD AND SYSTEM FOR QR CODE ORIGINATED VENDING

(71) Applicant: MASTERCARD ASIA/PACIFIC PTE. LTD., Singapore (SG)

(72) Inventors: Donghao Huang, Singapore (SG); Hui Fang, Sembawang (SG); Jiaming Li, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 584 days.

(21) Appl. No.: 16/616,358

(22) PCT Filed: Apr. 24, 2018

(86) PCT No.: PCT/SG2018/050199
§ 371 (c)(1),
(2) Date: Nov. 22, 2019

(87) PCT Pub. No.: WO2018/217163
PCT Pub. Date: Nov. 29, 2018

(65) Prior Publication Data
US 2020/0175489 A1 Jun. 4, 2020

(30) Foreign Application Priority Data
May 24, 2017 (SG) .......................... 10201704246R

(51) Int. Cl.
*G06Q 20/18* (2012.01)
*G06K 7/14* (2006.01)
(Continued)

(52) U.S. Cl.
CPC .......... *G06Q 20/18* (2013.01); *G06K 7/1413* (2013.01); *G06K 7/1417* (2013.01);
(Continued)

(58) Field of Classification Search
CPC .... G06Q 10/087; G06Q 10/08; G06Q 10/083; G06Q 10/0875; G06Q 30/06;
(Continued)

(56) References Cited

U.S. PATENT DOCUMENTS 8,856,045 B1 10/2014 Patel et al.
9,262,771 B1 2/2016 Patel
(Continued)

FOREIGN PATENT DOCUMENTS

CN 103106742 A 5/2013
CN 104794817 A * 7/2015
(Continued)

OTHER PUBLICATIONS

Zhu, Yunpu. A new architecture for secure two-party mobile payment transactions University of Lethbridge (Canada). ProQuest Dissertations Publishing, 2010. MR68790.*
(Continued)

*Primary Examiner* — Ariel J Yu
*Assistant Examiner* — Denisse Y Ortiz Roman
(74) *Attorney, Agent, or Firm* — Pillsbury Winthrop Shaw Pittman, LLP

(57) ABSTRACT

A method for originating a vending transaction via machine-readable code includes storing, in a memory of a computing device, an account identifier associated with a transaction account, reading, by an optical imaging device of the computing device, a machine-readable code displayed on a vending machine, wherein the machine-readable code is encoded with at least a device identifier, electronically transmitting, by a transmitting device of the computing device, at least the device identifier and an account identifier to a third party system, and receiving, by a receiving device of the computing device, a transaction confirmation indicat-
(Continued)

ing approval of a payment transaction involving the transaction account and the vending machine.

14 Claims, 6 Drawing Sheets

(51) Int. Cl.
  *G06Q 10/087* (2023.01)
  *G06Q 20/04* (2012.01)
  *G06Q 20/32* (2012.01)
  *G07F 9/00* (2006.01)
(52) U.S. Cl.
  CPC ....... *G06Q 10/087* (2013.01); *G06Q 20/0457* (2013.01); *G06Q 20/3276* (2013.01); *G06Q 20/3278* (2013.01); *G07F 9/002* (2020.05)
(58) Field of Classification Search
  CPC ............... G06Q 20/18; G06Q 20/0457; G06Q 20/3276; G06Q 20/3278; G06K 7/1413; G06K 7/1417
  USPC .......................................................... 705/28
  See application file for complete search history.

(56) References Cited

U.S. PATENT DOCUMENTS

| | | | | |
|---|---|---|---|---|
| 9,547,859 | B2* | 1/2017 | Patel | G06Q 20/327 |
| 2005/0102233 | A1* | 5/2005 | Park | G06Q 20/322 |
| | | | | 705/44 |
| 2008/0201213 | A1* | 8/2008 | Lee | G06Q 30/0251 |
| | | | | 705/14.38 |
| 2013/0035787 | A1* | 2/2013 | Canter | G06Q 30/0226 |
| | | | | 700/232 |
| 2013/0073365 | A1* | 3/2013 | McCarthy | G06Q 20/20 |
| | | | | 705/26.35 |
| 2013/0228624 | A1 | 9/2013 | Byrd et al. | |
| 2014/0074714 | A1* | 3/2014 | Melone | G06Q 20/322 |
| | | | | 235/487 |
| 2014/0136354 | A1* | 5/2014 | Emery | G06Q 20/322 |
| | | | | 705/21 |
| 2015/0294287 | A1 | 10/2015 | Lyons | |
| 2016/0335620 | A1 | 11/2016 | Lyons et al. | |
| 2017/0193479 | A1* | 7/2017 | Kamat | G06Q 20/3276 |

FOREIGN PATENT DOCUMENTS

| | | | |
|---|---|---|---|
| CN | 105825583 A | * | 8/2016 |
| JP | 2001297355 A | | 10/2001 |
| JP | 200263631 A | | 2/2002 |
| JP | 2002140756 A | | 5/2002 |
| JP | 2003331344 A | | 11/2003 |
| JP | 2004272586 A | | 9/2004 |
| JP | 2005141754 A | | 6/2005 |

OTHER PUBLICATIONS

Aljohani, Abdulkareem. A Unified Mobile Payment Transaction Exchange Service (UMTES) for Next-Generation Mobile Networks. University of South Wales (United Kingdom), ProQuest Dissertations Publishing, 2014. (Year: 2014).*
Wessel, Ginette M. Mobilizing Food Vending: Rights, Communication Technology and Urban Space in the American City. University of California, Berkeley ProQuest Dissertations Publishing, 2015. (Year: 2015).*
Japanese Office Action dated Feb. 8, 2021, from JP application No. 2019-564933, 12 pages.
PCT International Search Report and Written Opinion, Application No. PCT/SG2018/050199, dated Aug. 28, 2018, 9 pps.

* cited by examiner

METHOD AND SYSTEM FOR QR CODE ORIGINATED VENDING

CROSS REFERENCE TO RELATED APPLICATIONS

This patent application is a National Stage Entry of PCT/SG2018/050199 filed on Apr. 24, 2018, which claims the benefit and priority of Singapore Patent Application No. 10201704246R filed on May 24, 2017, the disclosures of which are incorporated by reference herein in their entirety as part of the present application.

BACKGROUND

The present disclosure relates to the origination of vending transactions using machine-readable codes, specifically the display of a machine-readable code, such as a quick response (QR) code, by a vending machine, which is then read by a separate mobile computing device to initiate a vending transaction that is remotely funded.

Vending machines have been long established as a way for consumers to obtain various products with great convenience. Vending machines offer a number of convenient features that provide their usefulness over traditional purchasing experiences. For instance, vending machines can be in operation twenty-four hours a day without personnel, can be placed in locations that are not conducive to a storefront, and can be used in a manner of seconds by a consumer to obtain their desired product or products. In order to keep up with the demands of consumer convenience, vending machines have evolved over the years to add additional features that are more useful to modern consumers.

For instance, many vending machines, which traditionally only accepted physical currency as payment, have been adapted to accept credit cards and other similar types of payment instruments. In addition, vending machines, which traditionally sold only consumable items, have been developed that sell any manner of products of varying sizes, shapes, weights, etc., such as electronics (e.g., smart phones, tablet computers, etc.), clothing, etc. However, one technological development that some vending machines have fallen behind with is adaptation to the prevalence of mobile computing devices.

Mobile computing devices, such as smart phones, smart watches, wearable devices, etc., have become a well-established piece of modern culture. One feature of such devices is their ability to be used to convey payment credentials in a financial payment transaction, replacing an individual's traditional wallet. However, many vending machines lack a suitable interface for communicating with a mobile communication device to receive payment credentials therefrom, in lieu of traditional paper currency or a supplied payment instrument. As a result, a technologically savvy consumer that uses their mobile device as their primary payment method may be unable to use a traditional vending machine.

In a manner to accommodate the rise in payment-capable computing devices, some methods have been developed to establish communications between a vending machine and a mobile device. For instance, one method has been developed that involves the installation of a Bluetooth-capable dongle in a vending machine, which enables the vending machine to electronically communicate with a consumer computing device, for the selection of products from the vending machine and supplying of payment credentials, such as described in U.S. Pat. No. 8,856,045, entitled "Mobile-device-to-machine payment systems," issued on Oct. 7, 2014, and U.S. Pat. No. 9,262,771, entitled "Method and system for providing offers for automated retail machines via mobile devices," issued on Feb. 16, 2016, each of which is herein incorporated by reference in its entirety. Other ways of using mobile payment devices in conjunction with vending machines are disclosed in U.S. Published Patent Application No. 2016/0335620, entitled "Vending Machine Transactions," published on Nov. 17, 2016, and U.S. Published Patent Application No. 2015/0294287, entitled "Method and system for Implementing Point of Sale Mobile Conversion Key," published on Oct. 15, 2015, herein incorporated by reference.

However, while such methods can enable use of a mobile computing device for payment at a vending machine, current methods all require the installation of additional technology in a vending machine, which requires either development of all new vending machines or physical retrofitting of existing vending machines. Given that there are potentially millions of vending machines throughout the world, the imposition of replacing or retrofitting existing vending machines by qualified technicians restricts wide adoption of such technology. That is, this is an expensive and time consuming process, as specialized hardware must be developed and then installed in each vending machine by adequately trained personnel. Additionally, such technology requires a consumer to have his short range wireless communication (e.g., Bluetooth) capability, which drains battery power, wirelessly broadcasts information about the consumer computing device and therefore potentially the consumer both before and during the transaction to other devices that might be used to snoop for sensitive data, and is often not left on by the consumer. Of course more basic consumer computing devices may not have short range communication capability, making this technology non-viable to that segment of the consuming population. Further still, multiple vending machines are often collocated, and the consumer would have to be given some indication or specialized knowledge of the user interface of the consumer computing device to be sure his device is in communication with the selected vending machine, and/or how to select another one. This is a far different and potentially confusing interaction as compared to the traditional experience of simply approaching the desired vending machine. Hence, even when vending machines and consumer computing devices can communicate via short range communications, there is still a need to allow for a more traditional vending machine selection process that does not require such short range communication and interface interaction at least during the initiation of a vending process.

As a result, there is a need for a technological solution to enable a mobile computing device to be used for payment in a vending machine, that permits the consumer to at least initiate a vending transaction without use of short range communications and/or without requiring the retrofitting of a vending machine with additional hardware and that may be accomplished without direct bidirectional communication between the vending machine and the consumer computing device.

BRIEF DESCRIPTION

The present disclosure provides a description of systems and methods for the origination of a vending transaction via a machine-readable code. A machine-readable code, such as a quick response (QR) code, is displayed on a vending machine that is encoded with details thereof, such as a device identifier associated with the vending machine. A consumer uses their mobile computing device to read the machine-readable code and decode the information encoded therein, and then establishes communication with a backend vending system, which is in communication with a payment system. The consumer can make selection of products directly on the vending machine, or via their mobile computing device, to facilitate the vending transaction, where payment is processed via the backend vending system and payment system, resulting in a method where a mobile computing device may be used by the consumer to effect payment in a vending transaction, with the vending machine having to do no more than display a suitable machine-readable code, enabling traditional vending machines to be used for the disclosed systems and methods with minimal modification.

A method for originating a vending transaction via machine-readable code includes storing, in a memory of a computing device, an account identifier associated with a transaction account, reading, by an optical imaging device of the computing device, a machine-readable code displayed on a vending machine, wherein the machine-readable code is encoded with at least a device identifier, electronically transmitting, by a transmitting device of the computing device, at least the device identifier and an account identifier to a third party system, and receiving, by a receiving device of the computing device, a transaction confirmation indicating approval of a payment transaction involving the transaction account and the vending machine.

A system for originating a vending transaction via machine-readable code includes a memory of a computing device configured to store an account identifier associated with a transaction account, an optical imaging device of the computing device configured to read a machine-readable code displayed on a vending machine, wherein the machine-readable code is encoded with at least a device identifier, a transmitting device of the computing device configured to electronically transmit at least the device identifier and an account identifier to a third party system, and a receiving device of the computing device configured to receive a transaction confirmation indicating approval of a payment transaction involving the transaction account and the vending machine.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definitions

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software including the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, vending machine, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Processing Vending Transactions via Machine-Readable Code

Figure 1:
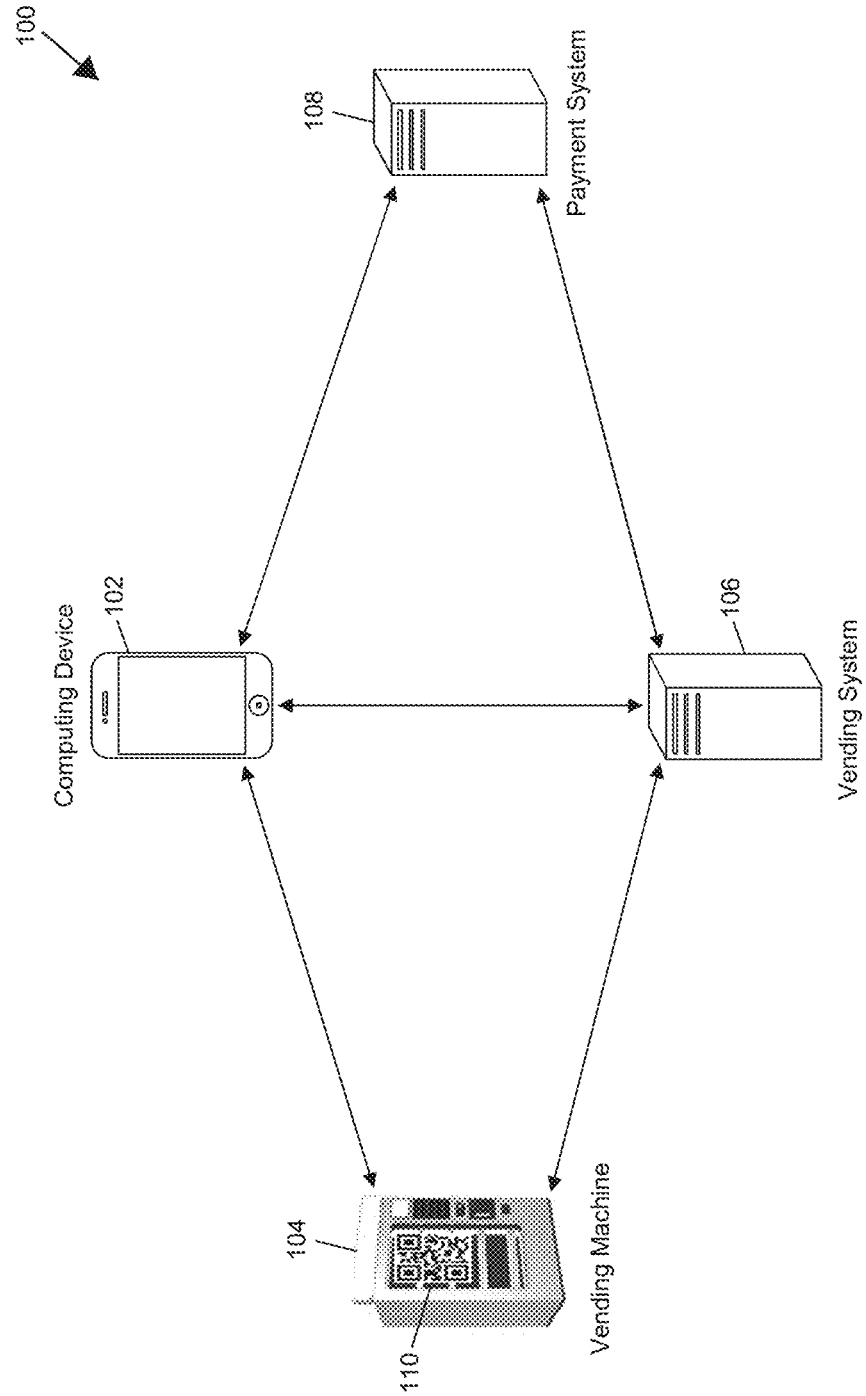
FIG. 1 is a block diagram illustrating a high level system architecture for vending transactions involving a mobile computing device utilizing a machine-readable code in accordance with exemplary embodiments.

FIG. 1 illustrates a system 100 for the origination of vending machine transactions using a machine-readable code displayed thereby using a mobile computing device and the processing thereof.

The system 100 may include a computing device 102. The computing device 102, discussed in more detail below, may be any type of mobile computing device specifically configured to perform the functions discussed herein, such as a specially programmed laptop computer, notebook computer, tablet computer, cellular phone, smart phone, smart watch, wearable computing device, implantable computing device, etc. The computing device 102 may include at least an optical imaging device (e.g., camera) configured to image machine-readable optical codes, including but not limited to bar codes and quick response (QR) codes, where the computing device 102 is configured to decode data encoded therein.

The system 100 may also include a vending machine 104. The vending machine 104 may have one or more products available for purchase by a user of the computing device 102 that may be dispensed thereby following purchase by the user. As discussed herein, the term "vending machine" may refer to any type of point of sale system that may be involved in a payment transaction and dispense one or more products or data related thereto to a consumer without human interaction beyond that of the consumer. For example, the vending machine 104 may house and vend the products directly, or may be a self-service kiosk where the consumer may order one or more products that may be delivered to the consumer at a later time and/or date, or made available to the consumer at an alternative location. The vending machine may vend physical or non-physical products (e.g., deliver e-books, etc. through a wired, wireless or optical interface to the consumer computing device 102).

The vending machine 104 may be configured to display a machine-readable code 110, such as a QR code, that is encoded with at least a device identifier. The device identifier may be a unique value that is uniquely associated with the vending machine 104 that is unique among all vending machines, or unique in a relevant market. The device identifier may be, for instance, an integer or alphanumeric value, such as a registration number, identification number, media access control address, etc. The machine-readable code 110 may be displayed on the vending machine 104 using any suitable method, such as via an electronic display (e.g., visual display on a light-emitting diode screen), or a physical display, such as printed on a sticker affixed to the vending machine 104 or physically painted or printed on the housing of the vending machine 104 itself. The consumer would use his computing device 102, typically by opening an appropriate application program, to image and decode the optical machine readable code 110, thereby allowing for a more traditional way of selecting the desired vending machine by physically walking up to it and taking affirmative steps to interact with it, not necessarily by operating a keypad or the like, but by facing a camera towards it, and without necessarily wirelessly transmitting or being required to continually detect and receive information broadcast by vending machines, to initiate a vending process.

In some embodiments, the machine-readable code 110 may also be encoded with data associated with the products available for purchase via the vending machine 104, such as product identifiers, product names, available quantities, product costs, etc. In cases where the machine-readable code 110 may be displayed electronically, the machine-readable code 110 may be dynamic, where the encoded data (e.g., and subsequently the visual design of the machine-readable code 110) may be changed as the product details of the vending machine 104 change (e.g., to account for changed inventory). Multiple QR codes can be displayed in sequence (either side-by-side in physical indicia or on a display device or in timed sequence) such as disclosed in U.S. patent Publication Ser. No. 13/410,335, entitled "Method and Apparatus for Transferring and Receiving Data Using Multi-Frame Bar Codes," which is herein incorporated by reference in its entirety.

The computing device 102 may read the machine-readable code 110 displayed by the vending machine 104 and decode the data encoded therein. The computing device 102 may then establish a communication channel with a vending system 106, which may be a backend computing system associated with the vending machine 104, such as of a manufacturing or managing entity of the vending machine 104 with a possible central intermediary server that distributes the information to the appropriate manufacturing or managing entity of the vending machine in circumstances where there might be more than one. In some embodiments, the communication channel established between the computing device 102 and the vending system 106 may utilize at least one of the Internet and a cellular communication network. Using this established communication channel, the computing device 102 may electronically transmit at least the device identifier decoded from the vending machine 104 and associated therewith and an account identifier to the vending system 106. The account identifier may be a unique value associated with a transaction account to be used for payment in the vending transaction. In some embodiments, the account identifier may be the primary account number and/or payment credentials suitable for use in processing a payment transaction for payment from the transaction account for payment of the vending transaction. In other embodiments, the account identifier may not include any payment credentials, but may be used in the identification thereof.

The vending system 106 may receive the device identifier and account identifier from the computing device 102 using the established communication channel. In some embodiments, the vending system 106 may then verify the authenticity of the transaction account associated with the account identifier, including the validity of the transaction account for use in the vending transaction. In such embodiments, the vending system 106 may contact a payment system 108 using a suitable communication network and method, where the payment system 108 may be a payment network or financial institution associated with the transaction account configured for the initiation and/or processing of the payment transaction as part of the vending transaction. The payment system 108 may be configured to identify the transaction account associated with the supplied account identifier and verify that the transaction account is valid and eligible for use in a vending transaction (e.g., has an available balance, is not prohibited from vending transactions, etc.). The payment system 108 may then provide verification of the validity of the transaction account to the vending system 106.

In some embodiments, the payment system 108 may first authenticate the computing device 102 as genuine and authorized for use of the transaction account prior to providing verification to the vending system 106. In such embodiments, the payment system 108 may utilize any suitable authentication method, such as verification of a username and password combination submitted by the computing device 102 to the payment system 108 (e.g., either directly via communication between the computing device 102 and payment system 108, or through the vending system 106). In some cases, the authentication may be performed by the vending system 106.

In some cases, verification of the transaction account may include pre-authorization of the transaction account for use in the subsequent payment transaction. For instance, the payment system 108 may receive the account identifier, and may pre-authorize the transaction account for a specified amount to be used in the payment transaction. Such an amount may be based on the properties of the transaction account itself (e.g., balance, credit limit, etc.), the product costs of the vending machine 104 (e.g., maximum product cost, average product cost, median product cost, cost of average transaction, cost of a multiple of highest cost products to provide for multiple vends, etc.), or other suitable criteria. In these instances, the vending machine 104 may be configured to immediately vend selected products where the total product cost is within the pre-authorized amount.

Once the vending system 106 has verified the transaction account, if necessary, the vending system 106 may provide a notification to the vending machine 104 that a vending transaction is to be initiated. The notification may be provided to the vending machine 104 using a communication channel established between the vending machine 104 and the vending system 106. In some cases, the communication channel established between the vending machine 104 and the vending system 106 may utilize a separate communication channel, such as through a WiFi or other local network connecting several vending machines to a router connected to a larger network such as the Internet, or the same communication network and/or method as the communication channel established between the computing device 102 and the vending system 106. The computing device 102 can interact with the vending machine 104 in a variety of ways, such as prompting the consumer to input information through the vending machines human interface (e.g., keypad), though an optical reader on the vending machine via optical machine readable codes 110 displayed on a display screen of the computing device 102, wirelessly through short range communications or through a wired connection using Bluetooth, radio frequency, near field communication, a local area network, or other suitable communication network and method, though greater benefits of the system described herein may be available if the vending system 106 and vending machine 104 communicate via a separate communication channel, as explained above. In some embodiments, the vending system 106 may electronically transmit a notification to the computing device 102 using the communication channel established therewith to notify to the user of the computing device 102 that the transaction account was successfully validated.

The vending machine 104 may receive the notification from the vending system 106 and initiate a vending transaction through one of or both of the aforementioned communication channels. Initiation of the vending transaction may result in the vending machine 104 utilizing internal commands to activate an ability for the user of the computing device 102 to select one or more products for purchase. In some cases, activation of such an ability may be physically indicated by the vending machine 104, such as via a display device configured to display a message prompting the user to select one or more products for purchase. The vending machine 104 may include an input device through which the user may select one or more products to purchase as part of the vending transaction.

In some embodiments, the user may utilize the computing device 102 to select products for purchase. In such embodiments, the computing device 102 may display a prompt to the user to select products following receipt of the notification from the vending system 106. In these embodiments, the computing device 102 may display products details for the products available via the vending machine 104, where the product details may have been decoded from the machine-readable code 110, received as part of the notification from the vending system 106, or may be received separately from the vending machine 104 via communication therewith. For instance, the vending machine 104 may establish a communication channel with the computing device 102, which may be used to electronically transmit product details to the computing device 102 once the vending transaction has been initiated (e.g., as instructed by the vending system 106). In such instances, the communication channel established between the vending machine 104 and the computing device 102 may be of a different communication network and/or method than used in communications with the vending system 106. For instance, the vending machine 104 and computing device 102 may communicate using Bluetooth, radio frequency, near field communication, a local area network, or other suitable communication network and method, as mentioned above.

Once the product(s) have been selected, the selection data may be returned to the vending system 106 as part of a vending request electronically transmitted thereto (e.g., via the vending machine 104 or computing device 102, as applicable) using the established communication channel. The vending system 106 may receive the product selection details, which may include a product cost for each product and/or a product identifier (e.g., which may be used to identify the product cost, such as in a look-up table stored therein or otherwise available to the vending system 106). The vending system 106 may then communicate with the payment system 108 to initiate a payment transaction for payment from the transaction account associated with the account identifier supplied by the computing device 102, where the amount may be based on at least the product cost of each selected product (e.g., plus taxes or any other applicable fees). The payment system 108 may process the payment transaction using traditional methods and systems, and may provide a notification to the vending system 106 once the payment transaction is successfully processed.

Following the processing of the payment transaction, the vending system 106 may return a vending ticket to the vending machine 104. The vending ticket may include at least an indication that the payment transaction was successfully processed. In some embodiments, the vending ticket may include the product identifiers for each selected product, which may be used by the vending machine 104 to identify products for dispensing. In other embodiments, the vending machine 104 and vending system 106 may use a session identifier or other unique value associated with the vending transaction. In such embodiments, the vending request submitted to the vending system 106 may include the session identifier, which may be associated with the selected products in the vending machine 104, such that the vending machine 104 may identify the selected products via the inclusion of the session identifier in the vending ticket issued thereto by the vending system 106. In cases where the machine-readable code 110 may be dynamic, the vending machine 104 may generate or otherwise identify a new session identifier for each vending transaction that may be encoded in the machine-readable code 110 displayed thereby.

Upon receipt of the vending ticket, the vending machine 104 may identify the selected products and dispense them to the user of the computing device 102 using a suitable method. In some cases, the vending ticket may be issued to the computing device 102 by the vending system 106. In such cases, the computing device 102 may forward the vending ticket to the vending machine 104 using the communication channel established therewith. In instances where the computing device 102 may be used to make product selections, the vending ticket may include the product identifiers, either as issued by the vending system 106 or inserted into the vending ticket by the computing device 102.

The methods and systems discussed herein thus enable a vending transaction to be initiated and carried out by a computing device 102, including remote payment of the corresponding payment transaction, without requiring communication between the vending machine 104 and the computing device 102, using a machine-readable code 110 displayed by the vending machine 104. As such, the methods and systems discussed herein may be performed using existing vending machines with minimal modification thereto, such as the affixing of a sticker displaying the vending machine's corresponding machine-readable code 110, without requiring the complicated installation of additional hardware into the vending machine 104. In cases where a vending machine 104 may already include suitable hardware, the use of a machine-readable code 110 to initiate the vending transaction may reduce the number of communications necessary between the computing device 102 and vending machine 104, including negating the need for such communications entirely, which may reduce the computing power, and thus electricity consumed, used by the vending machine 104. Furthermore, the use of a machine-readable code 110 may enable initiation of vending transactions using computing devices 102 that are not capable of communicating with the vending machine 104, such as for computing devices 102 that lack the protocols for establishing a communication channel with the vending machine 104 using its associated communication method.

Computing Device

Figure 2:
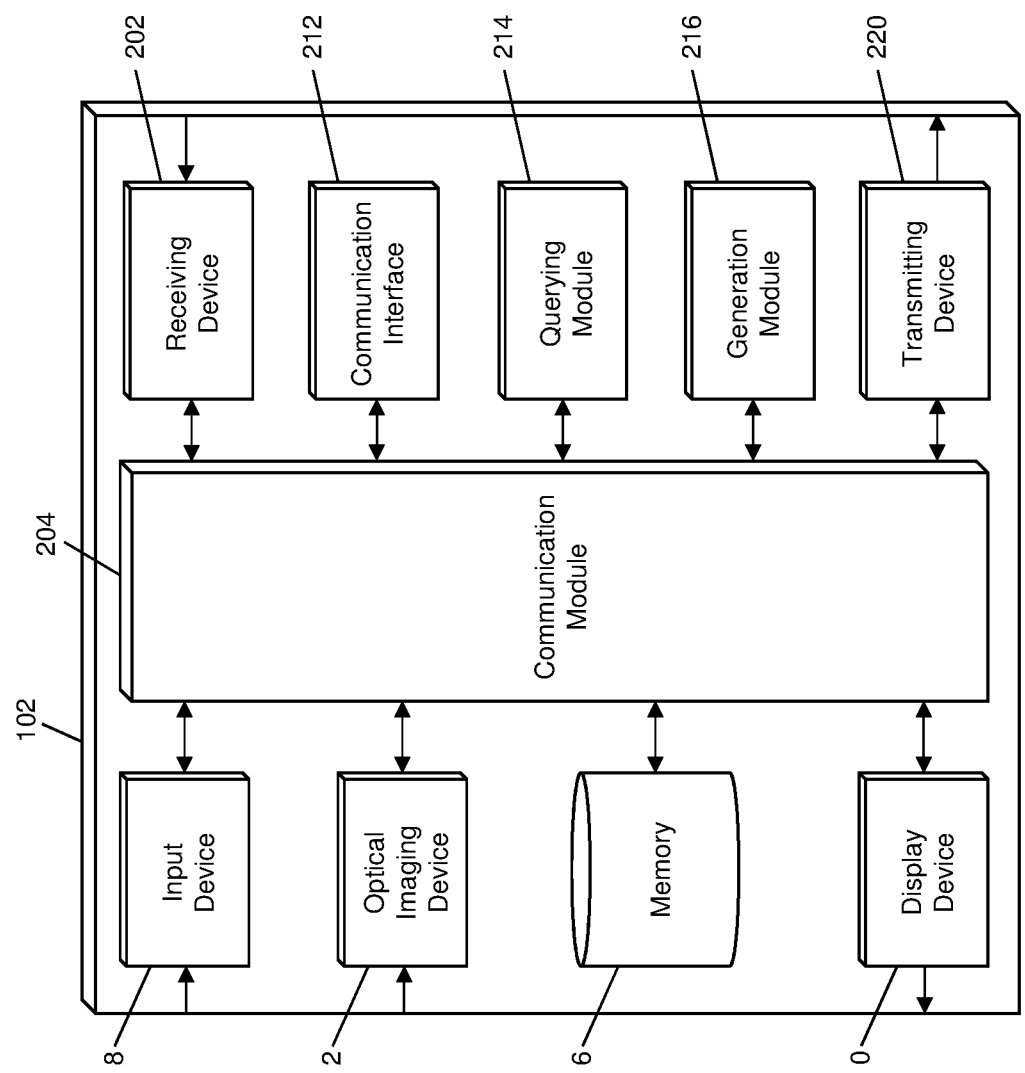
FIG. 2 is a block diagram illustrating the computing device of the system of FIG. 1 for the origination of a vending transaction via a machine-readable code in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 500 illustrated in FIG. 5 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from vending machines 104, vending systems 106, payment systems 108, and other systems and entities via one or more communication methods, such as radio frequency, local area networks, wireless area networks, cellular communication networks, Bluetooth, the Internet, etc. In some embodiments, the receiving device 202 may include multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by vending systems 106 that are superimposed or otherwise encoded with transaction confirmations, which may include confirmations of the validation of a transaction account for use in a vending transaction. In some cases, the receiving device 202 may also be configured to receive data signals electronically transmitted by vending systems 106 that are superimposed or otherwise encoded with vending tickets. The receiving device 202 may be further configured to receive data signals electronically transmitted by payment systems 108, which may be superimposed or otherwise encoded with data used in the registration of a transaction account or use thereof in a payment transaction corresponding to a vending transaction, such as a request for authentication data or the receipt of payment credentials. In some embodiments, the receiving device 202 may also be configured to receive data signals electronically transmitted by vending machines 104, such as may be superimposed or otherwise encoded with product details or other data associated with the vending transaction. In such embodiments, the receiving device 202 may utilize different communication methods for receipt of data signals from vending machines 104 than used for the receipt of data signals from vending systems 106.

The computing device 102 may also include a communication module 204. The communication module 204 may be configured to transmit data between modules, engines, databases, memories, and other components of the computing device 102 for use in performing the functions discussed herein. The communication module 204 may include one or more communication types and utilize various communication methods for communications within a computing device. For example, the communication module 204 may include a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include a plurality of engines and/or modules specially configured to perform one or more functions of the processing device, such as a querying module 214, generation module 216, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may also include a memory 206. The memory 206 may be configured to store data for use by the computing device 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 206 may include a relational database that utilizes structured query language for the storage, identification, modifying, updating, accessing, etc. of structured data sets stored therein. The memory 206 may be configured to store, for example, application program data for an application program to provide an interface to the user for the reading of machine-readable codes 110, for an application program to provide an interface to the user for the selection of products for the vending transaction, an application program to provide an interface to the user for authentication for use of a transaction account, etc.

The computing device 102 may also include or be otherwise interfaced with one or more input devices 208. The input devices 208 may be internal to the computing device 102 or external to the computing device 102 and connected thereto via one or more connections (e.g., wired or wireless) for the transmission of data to and/or from. The input devices 208 may be configured to receive input from a user of the computing device 102, which may be provided to another module or engine of the computing device 102 (e.g., via the communication module 204) for processing accordingly. Input devices 208 may include any type of input device suitable for receiving input for the performing of the functions discussed herein, such as a keyboard, mouse, click wheel, scroll wheel, microphone, touch screen, track pad, camera, optical imager, etc. The input device 208 may include an optical imaging device 222, which may be configured to read machine-readable codes 110 displayed by the vending machine 104 and decode data encoded therein. The input device 208 may also be configured to receive input from the user of the computing device 102, such as for the selection of products for the vending transaction.

The computing device 102 may also include or be otherwise interfaced with a display device 210. The display device 210 may be internal to the computing device 102 or external to the computing device 102 and connected thereto via one or more connections (e.g., wired or wireless) for the transmission of data to and/or from. The display device 210 may be configured to display data to a user of the computing device 102. The display device 210 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 210. The display device 210 may be configured to, for example, display interfaces to the user of the computing device 102 for the reading of machine-readable codes 110 and selection of products, as well as for the display of payment transaction and vending transaction notifications.

The computing device 102 may also include a communication interface 212. The communication interface 212 may provide for input and output from the computing device 102 and a plurality of different communication networks, utilizing the appropriate communication protocols and instructions necessary for communication therewith. The communication interface may be configured to establish a communication channel with the vending system 106 using a first communication method for the exchange of communications therewith, and may, in applicable embodiments, be configured to transmit communications to vending machines 104 via a second communication method. In such embodiments, the second communication method may utilize short range communications, such as radio frequency, Bluetooth, near field communication, etc.

The computing device 102 may include a querying module 214. The querying module 214 may be configured to execute queries on databases to identify information. The querying module 214 may receive one or more data values or query strings, and may execute a query string based thereon on an indicated database, such as the memory 206, to identify information stored therein. The querying module 214 may then output the identified information to an appropriate engine or module of the computing device 102 as necessary. The querying module 214 may, for example, execute a query on the memory 206 to identify an account identifier stored therein for transmission to the vending system 106 for identification of a transaction account to be used in the payment transaction.

The computing device 102 may also include a generation module 216. The generation module 216 may be configured to generate data for use in performing the functions of the computing device 102 as discussed herein. The generation module 216 may receive instructions as to data to generate as input, may generate the data as instructed, and may output the generated data to another module or engine of the computing device 102. For example, the generation module 216 may be configured to generate data messages, which may be electronically transmitted via suitable communication methods, such as for electronic transmission to vending systems 106 that include device identifiers and account identifiers to initiate vending transactions.

The computing device 102 may also include a transmitting device 220. The transmitting device 220 may be configured to transmit data over one or more networks via one or more network protocols. In some instances, the transmitting device 220 may be configured to transmit data to vending machines 104, vending systems 106, payment systems 108, and other entities via one or more communication methods, local area networks, wireless area networks, cellular communication, Bluetooth, radio frequency, the Internet, etc. In some embodiments, the transmitting device 220 may include multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to vending systems 106, which may be superimposed or otherwise encoded with transaction requests, which may include at least a device identifier associated with a vending machine 104 and an account identifier associated with a transaction account. The transmitting device 220 may also be configured to electronically transmit data signals to vending systems 106 and/or payment systems 108, which may be superimposed or otherwise encoded with authentication data used to authenticate the computing device 102 and/or the user thereof as authorized for use of the transaction account corresponding to the account identifier in the payment transaction. In some embodiments, the transmitting device 220 may be configured to electronically transmit data signals to vending machines 104, which may be superimposed or otherwise encoded with vending tickets or requests for product details.

Processing of a Vending Transaction via Machine-Readable Code

Figure 3A:
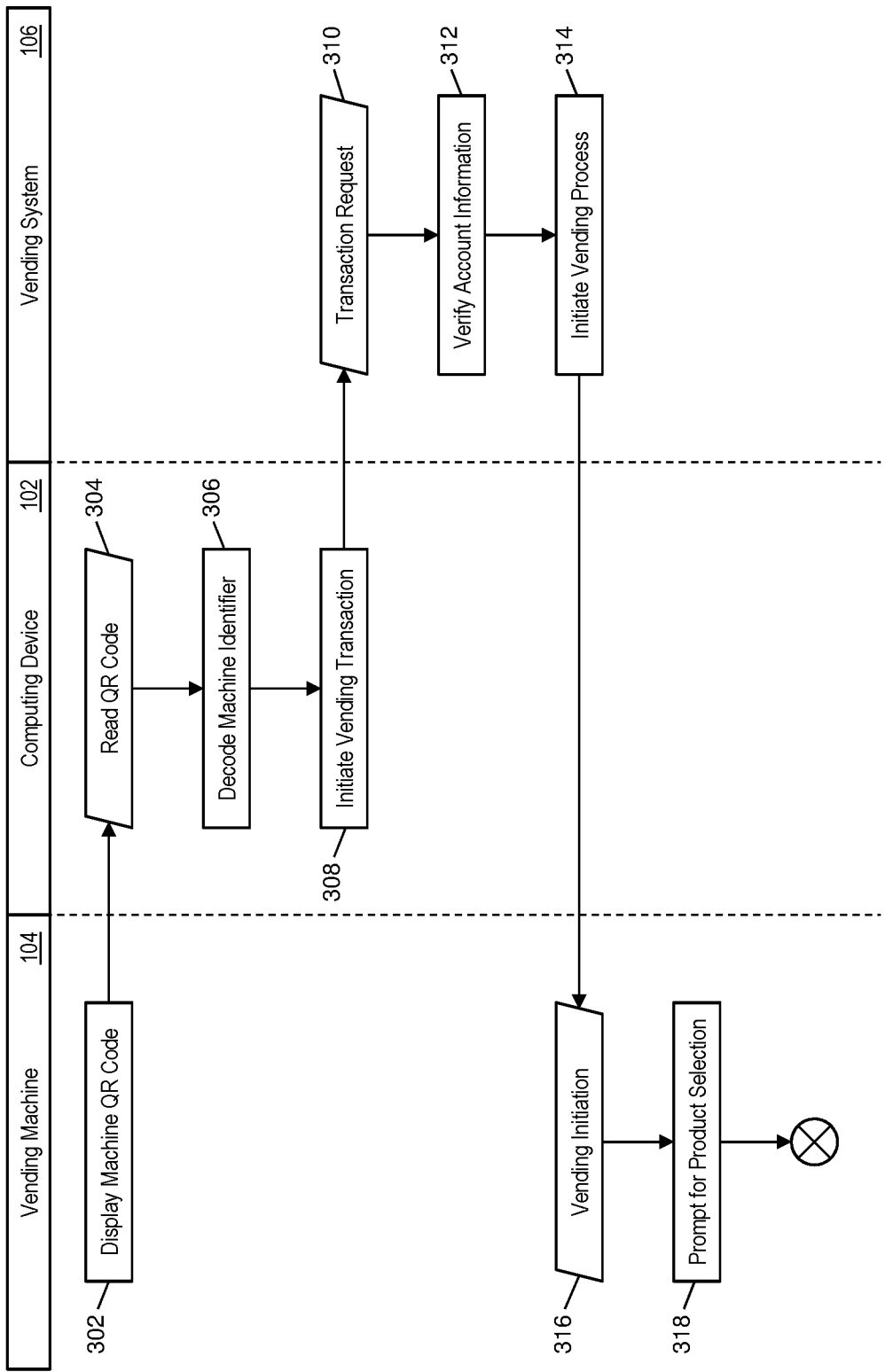
FIGS. 3A and 3B are a flow diagram illustrating a process for processing a vending transaction involving a mobile computing device using a machine-readable code in the system of FIG. 1 in accordance with exemplary embodiments.
Figure 3B:
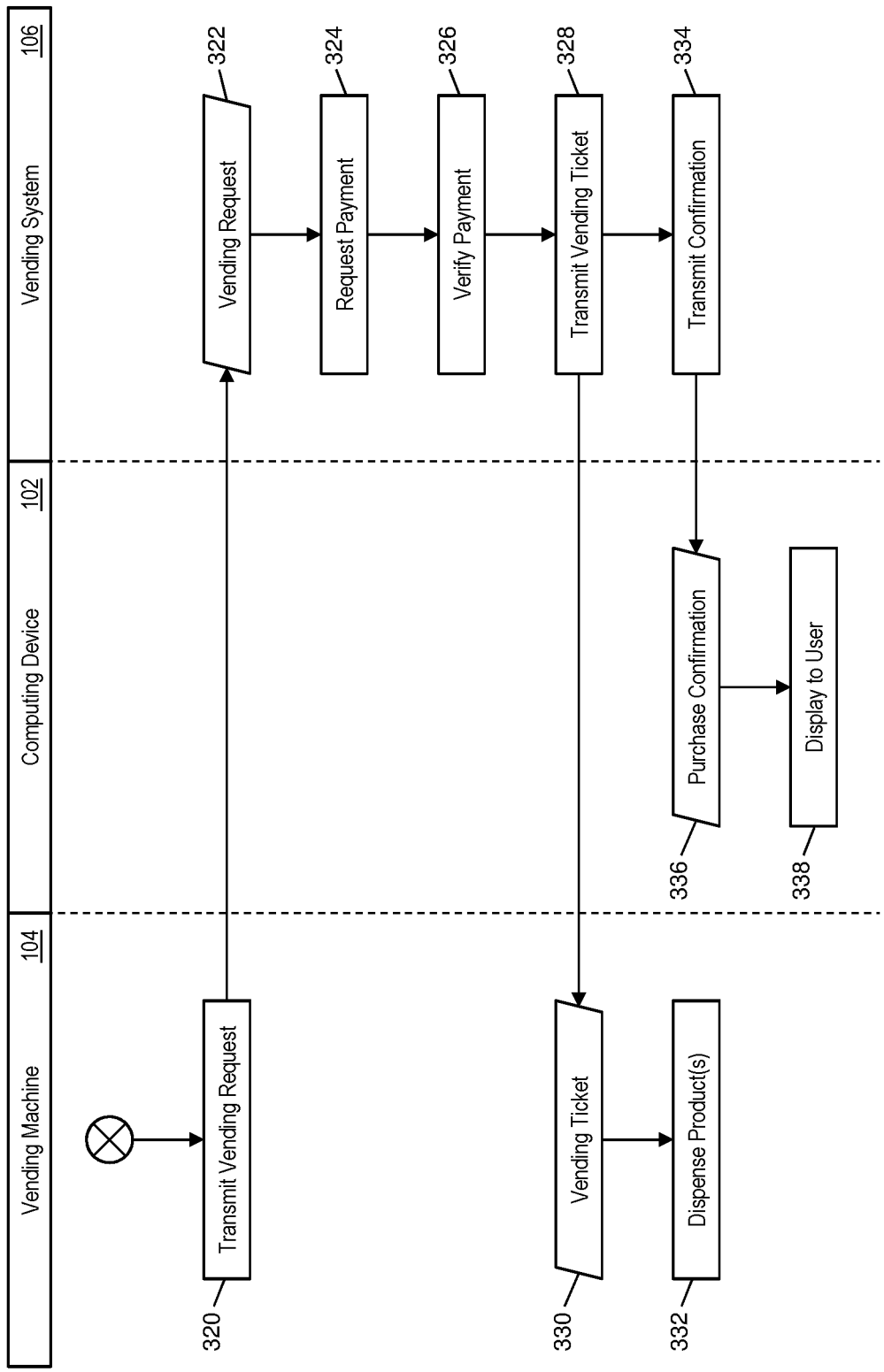

FIGS. 3A and 3B illustrates a process executed in the system 100 for the processing of a vending transaction utilizing the computing device 102 without requiring communication between the computing device 102 and the vending machine 104 via a machine-readable code 110 displayed thereby.

In step 302, the vending machine 104 may display a QR code thereon that is encoded with at least a device identifier associated with the vending machine 104. In some embodiments, the QR code may be a dynamic QR code displayed via an electronic display of the vending machine 104, and may also be encoded with product details associated with products available for purchase via the vending machine 104, such as product identifiers, product quantities, product costs, etc. In step 304, the QR code may be read by an optical imaging device 222 of the computing device 102. In step 306, the optical imaging device 222 of the computing device 102 may decode the QR code to obtain the data encoded therein, including at least the device identifier associated with the vending machine 104.

In step 308, the transmitting device 220 of the computing device 102 may electronically transmit a transaction request to the vending system 106 to initiate a vending transaction. The transaction request may include at least the device identifier decoded from the QR code as well as an account identifier associated with a transaction account to be used to fund the vending transaction, such as may be stored in the memory 206 of the computing device 102 and identified via a query executed thereon by the querying module 214 of the computing device 102. In some embodiments, the QR code may also include communication data used by the computing device 102 to identify the vending system 106 for electronic transmission of the transaction request thereto. In step 310, the vending system 106 may receive the transaction request from the computing device 102 using a suitable communication network and method.

In step 312, the vending system 106 may communicate with the payment system 108 to verify the transaction account to be used to fund the vending transaction based on the supplied account identifier included in the transaction request. In some embodiments, step 312 may include the authentication of the computing device 102 and/or the user thereof. In some instances, the computing device 102 and/or user thereof may be authenticated prior to step 302. Once the transaction account has been verified, then, in step 314, the vending system 106 may electronically transmit an instruction to the vending machine 104 to initiate the vending transaction. In step 316, the vending machine 104 may receive the instruction from the vending system 106.

In step 318, the vending machine 104 may initiate the vending transaction as instructed, which may result in a prompt to the user of the computing device 102 to select one or more of the vending machine's products for purchase. The selection may be made by the user, and then, in step 320, the vending machine 104 may electronically transmit a vending request to the vending system 106. In some embodiments, steps 316-320 may be performed by the computing device 102. In such embodiments, the computing device 102 may receive product details for the products available via the vending machine 104, which may be decoded from the QR code, received in the instruction submitted by the vending system 104 and received in step 316, or received via an electronic transmission from the vending machine 104, such as in response to a request submitted thereto by the computing device 102.

In step 322, the vending system 106 may receive the vending request for the vending transaction. The vending request may include at least the device identifier, account identifier, and product cost and/or product identifier for each selected product. In some cases, the vending request may include a session identifier either in addition to or in alternative to the device identifier and account identifier. In such cases, the transaction request submitted to the vending system 106 in step 310 may have also included the session identifier, which may have been encoded in the QR code displayed on the vending machine 104 and read by the computing device 102.

In step 324, the vending system 106 may request that payment for the vending transaction be made using the transaction account, such as by notifying the payment system 108 that the product selection(s) has been made and the corresponding product cost(s), as well as indicating the account identifier associated with the transaction account to be used. In step 326, the vending system 106 may verify that the payment transaction was successfully processed and payment made from the transaction account (e.g., to an account associated with the vending machine 104, vending system 106, etc.). In step 328, the vending system 106 may electronically transmit a vending ticket to the vending machine 104. The vending ticket may be received by the vending machine 104, in step 330, and may include at least the product identifier for each purchased product and/or the session identifier for the vending transaction. In some embodiments, the vending ticket may be electronically transmitted to the computing device 102, which may be forwarded to the vending machine 104 by the transmitting device 220 thereof. In step 332, the vending machine 104 may dispense the selected product(s) to the user of the computing device 102.

In step 334, the vending system 106 may electronically transmit a confirmation message for the payment transaction to the computing device 102. In step 336, the receiving device 202 of the computing device 102 may receive the confirmation message. The confirmation message may be a confirmation that the payment transaction was successfully processed. In step 338, the display device 210 of the computing device 102 may display the confirmation message to the user thereof, which may be viewed by the user of the computing device 102 to ensure that payment for the vending transaction was successfully made.

Figure 4:
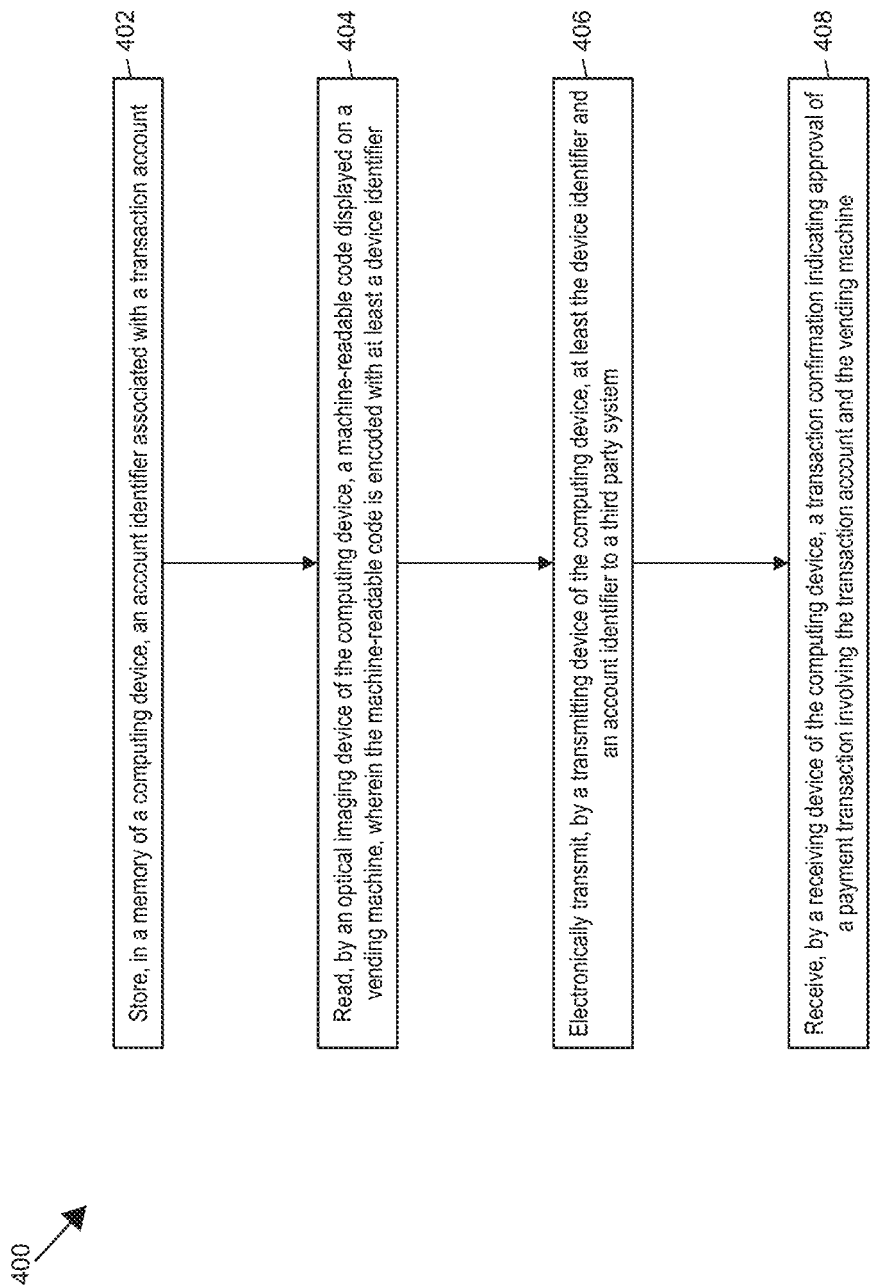
FIG. 4 is a flow chart illustrating an exemplary method for originating a vending transaction via machine-readable code in accordance with exemplary embodiments.

Exemplary Method for Originating a Vending Transaction via Machine-Readable Code FIG. 4 illustrates a method 400 for the origination of a vending transaction via a machine-readable code displayed by a vending machine and read by a consumer computing device, without requiring any electronic communication between the vending machine and the consumer computing device.

In step 402, an account identifier may be stored in a memory (e.g., the memory 206) of a computing device (e.g., the computing device 102), wherein the account identifier is associated with a transaction account. In step 404, a machine-readable code (e.g., the machine-readable code 110) displayed by a vending machine (e.g., the vending machine 104) may be read by an optical imaging device (e.g., the optical imaging device 222) of the computing device, wherein the machine-readable code is encoded with at least a device identifier.

In step 406, at least the device identifier and the account identifier may be electronically transmitted by a transmitting device (e.g., the transmitting device 220) of the computing device to a third party system (e.g., the vending system 106).

In step 408, a transaction confirmation may be received by a receiving device (e.g., the receiving device 202) of the computing device from the third party system, wherein the transaction confirmation indicates approval of a payment transaction involving the transaction account and the vending machine.

In one embodiment, the method 400 may further include displaying, on a display device (e.g., the display device 210) interfaced with the computing device, one or more product data entries, wherein each product data entry is related to a product available in the vending machine and includes at least a product name and product cost, receiving, by an input device (e.g., an input device 208) interfaced with the computing device, at least one selected product data entry of the one or more product data entries, and electronically transmitting, by the transmitting device of the computing device, the at least one selected product data entry to the third party system. In a further embodiment, the one or more product data entries may be encoded in the machine-readable code. In another further embodiment, the method 400 may also include receiving, by the receiving device of the computing device, the one or more product data entries from the third party system.

In some embodiments, the transaction confirmation may further include a vending ticket, the vending ticket includes at least the device identifier and one or more product identifiers. In a further embodiment, the method 400 may further include electronically transmitting, by the transmitting device of the computing device, the vending ticket to the vending machine. In an even further embodiment, the transmitting device of the computing device may be configured to electronically transmit data to the third party system using a first communication protocol and electronically transmit data to the vending machine using a second communication protocol. In a yet further embodiment, the first communication protocol may be one of the Internet and cellular communication, and the second communication protocol may be one of Bluetooth, radio frequency, and near field communication.

Computer System Architecture

Figure 5:
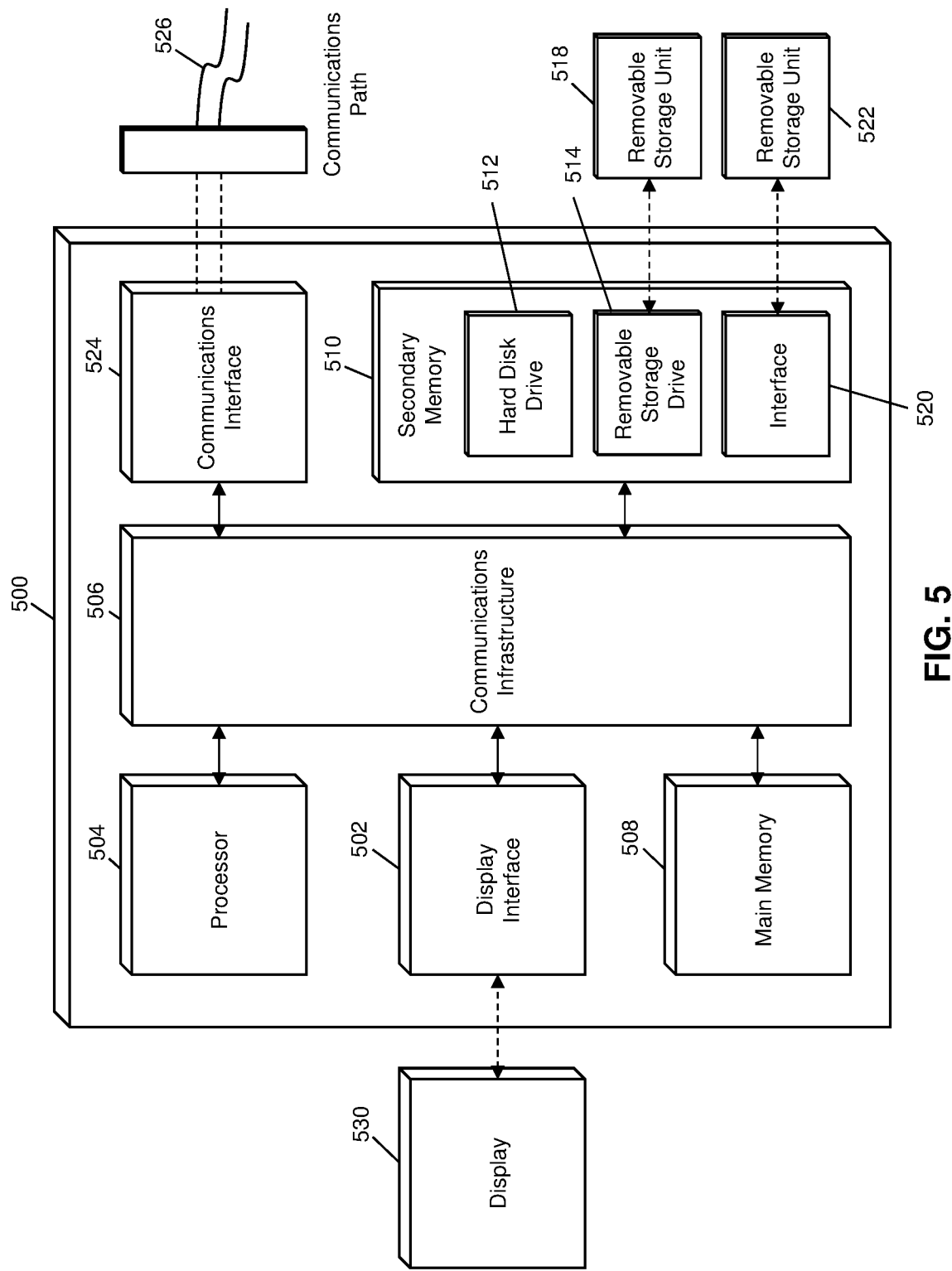
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may include one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for origination of vending transactions via machine-readable code. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for originating a vending transaction via machine-readable code, the method comprising:
  storing, in a memory of a computing device, an account identifier associated with a transaction account of a user;
  reading, by an optical imaging device of the computing device, a machine-readable code displayed on a vending machine, wherein the machine-readable code:
    is encoded with at least a device identifier identifying the vending machine; and
    is dynamic such that the machine-readable code is usable only for completing the vending transaction, and a subsequent vending transaction with the vending machine can be performed only by utilizing a subsequent machine-readable code;
  electronically transmitting, by a transmitting device of the computing device, at least the device identifier and the account identifier to a third party vending system that is a distinct entity from the vending machine and is in communication with the vending machine;
  responsive to the electronic transmitting to the third party vending system, receiving, by the computing device from a third party payment system that is a distinct entity from both the third party vending system and the vending machine and is in communication with the third party vending system, an authentication request to verify the authenticity of the transaction account;
  responsive to the authentication request, transmitting, by the transmitting device, a verification message to the third party payment system indicating the authenticity of the transaction account;
  responsive to the third party payment system receiving the verification message:
    obtaining, by the computing device from the third party payment system, a pre-authorization of an amount to purchase one or more products in the transaction, based on funds available in the transaction account; and
    obtaining, by the computing device from the third party vending system, one or more product data entries that each indicates a product available in the vending machine and includes at least a product cost for the product;

displaying, on a display device interfaced with the computing device, the one or more product data entries;

receiving, by an input device interfaced with the computing device, at least one selected product data entry of the one or more product data entries;

electronically transmitting, by the transmitting device of the computing device, an indication of the at least one selected product data entry to the third party vending system;

receiving, by a receiving device of the computing device from the third party payment system, a transaction confirmation indicating approval of a payment transaction involving the transaction account and the vending machine, and indicating that the vending machine will dispense the at least one selected product based on the vending system transmitting instructions to the vending machine to dispense the at least one selected product.

2. The method according to claim 1, wherein the one or more product data entries are encoded in the machine-readable code, and wherein obtaining the one or more product data entries comprises:

obtaining the one or more product data entries from the machine-readable code.

3. The method according to claim 1, wherein the transaction confirmation further includes a vending ticket, the vending ticket including at least the device identifier and one or more product identifiers.

4. The method according to claim 1, wherein the transmitting device of the computing device is configured to electronically transmit data to at least one of the third party vending system and the third party payment system using a first communication protocol and electronically transmit data to the vending machine using a second communication protocol.

5. The method according to claim 4, wherein the first communication protocol is one of the Internet and cellular communication, and wherein the second communication protocol is one of Bluetooth, radio frequency, and near field communication.

6. The method according to claim 1, wherein obtaining the one or more product data entries further comprises: obtaining an indication of a quantity available for each of the one or more products.

7. A system for originating a vending transaction via machine-readable code, the system comprising:

a memory of a computing device to store an account identifier associated with a transaction account of a user;

an optical imaging device of the computing device to read a machine-readable code displayed on a vending machine, wherein the machine-readable code:

is encoded with at least a device identifier identifying the vending machine; and is dynamic such that the machine-readable code is usable only for completing the vending transaction, and a subsequent vending transaction with the vending machine can be performed only by utilizing a subsequent machine-readable code;

a transmitting device of the computing device to electronically transmit at least the device identifier and the account identifier to a third party vending system that is a distinct entity from the vending machine and is in communication with the vending machine;

a processor to obtain from the third party vending system one or more product data entries that each indicates a product available in the vending machine and includes at least a product cost for the product;

a display device to display the one or more product data entries;

an input device to receive at least one selected product data entry of the one or more product data entries;

wherein the transmitting device is to transmit an indication of the at least one selected product data entry to the third party vending system; and a receiving device of the computing device to receive, from a third party payment system that is distinct from both the third party vending system and the vending machine and is in communication with the third party vending system, a transaction confirmation indicating approval of a payment transaction involving the transaction account and the vending machine;

wherein responsive to the transmitting of at least the device identifier and the account identifier to the third party vending system, the receiving device is to receive from the third party payment system an authentication request to verify the authenticity of the transaction account;

wherein responsive to the receiving the authentication request, the transmitting device is to transmit a verification message to the third party payment system indicating the authenticity of the transaction account;

wherein responsive to the third party payment system receiving the verification message, the receiving device is to receive a pre-authorization of an amount to purchase the one or more products in the transaction, based on funds available in the transaction account; and wherein responsive to receiving the pre-authorization, the receiving device is to receive an indication that that the vending machine will dispense the at least one selected product based on the vending system transmitting instructions to the vending machine to dispense the at least one selected product.

8. The system according to claim 7, wherein the one or more product data entries are encoded in the machine-readable code, and wherein to obtain the one or more product data entries, the processor is further to:

obtain the one or more product data entries from the machine-readable code.

9. The system according to claim 7, wherein to obtain the one or more product data entries, the processor is further to obtain the one or more product data entries via the receiving device, which receives the one or more product data entries from the third party vending system.

10. The system according to claim 7, wherein the transaction confirmation further includes a vending ticket, the vending ticket including at least the device identifier and one or more product identifiers.

11. The system according to claim 7, wherein the transmitting device of the computing device is further configured to electronically transmit data to at least one of the third party vending system and the third party payment system using a first communication protocol and electronically transmit data to the vending machine using a second communication protocol.

12. The system according to claim 11, wherein the first communication protocol is one of the Internet and cellular communication, and wherein the second communication protocol is one of Bluetooth, radio frequency, and near field communication.

13. The system according to claim 7, wherein the one or more product data entries further include an indication of a quantity available for each of the one or more products.

14. A vending system in communication with a vending machine, a payment system, and a computing device, the vending system comprising:
a processor programmed to:
receive, from the computing device, a dynamic identification of the vending machine that is usable for only one transaction with the vending machine and a subsequent transaction with the vending machine can be performed only by utilizing a subsequent dynamic identification of the vending machine;
obtain, based on the identification, one or more product data entries each relating to a product available for vending at the vending machine;
transmit, to the computing device for selection, the one or more product data entries relating to one or more products for purchase at the vending machine, the one or more product data entries comprising at least a product cost for each respective product from among the one or more products;
receive, from the computing device, an indication of a selection of one or more products and an account identifier, the one or more products having been selected at the computing device for vending by the vending machine;
obtain, from the payment system that is geographically remote from the vending system, a pre-authorization that covers the purchase of the one or more products;
after receiving the indication of the selection:
verify, using the pre-authorization, a transaction account associated with the account identifier based on the product cost for the selection by communicating with the payment system; and
obtain, from the payment system, an amount for the pre-authorization based on the product cost of the selection; or
before receiving the indication of the selection:
verify, using the pre-authorization, the transaction account; and
obtain an amount for the pre-authorization based on funds available in the transaction account; and
transmit a result of the verification, including an indication of the pre-authorization and an indication of the one or more products that is purchased using the pre-authorization, to the vending machine to cause the vending machine to vend the selected one or more products.

* * * * *